Figure 1:
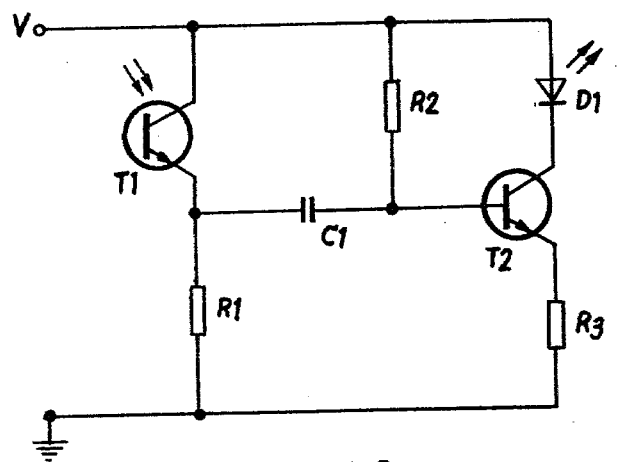

United States Patent [19]

Bergström

[11] 4,247,765

[45] Jan. 27, 1981

[54] PULSED FEEDBACK CIRCUIT FOR AN OPTOELECTRONIC DETECTOR

[76] Inventor: Arne Bergström, Ängsövägen 7, 180 10 Enebyberg, Sweden

[21] Appl. No.: 706

[22] Filed: Jan. 3, 1979

[51] Int. Cl.$^3$ .............................................. H01J 40/14
[52] U.S. Cl. .................................. 250/214 R; 250/205
[58] Field of Search .................. 250/205, 214 R, 221, 250/222; 307/311

[56] References Cited

U.S. PATENT DOCUMENTS

| 3,631,250 | 12/1971 | VanBuskirk | 250/205 |
| 3,721,123 | 3/1973 | Heim | 250/205 |
| 4,054,795 | 10/1977 | Kinder | 250/205 |

Primary Examiner—David C. Nelms
Attorney, Agent, or Firm—Holman & Stern

[57] ABSTRACT

An opto-electronic detector has a radiation-emitting element and a radiation receiving element which are linked optically and also by an electronic circuit so that the radiation-emitting element is caused to produce radiation pulses due to feedback between the radiation-emitting and receiving elements.

The construction of the electronic circuit is such that sharp pulses are produced having an amplitude and frequency dependent on the optical feedback factor, and such that the pulses are spaced by intervals in which the radiation-emitting element is entirely extinguished.

The electronic circuit comprises a current amplifier (T2) which feeds the radiation-emitting element (D1). This amplifier is controlled by the radiation-receiving element (T1) and by a filter (R1C1) which incorporates a storage element such as a capacitor. The control of the amplifier (T2) is effected via an input of the amplifier which has a low impedance in the forward direction and a high impedance in the reverse direction so that increasing current transients in a load circuit (R3) of the amplifier are selectively amplified by optical feedback.

3 Claims, 2 Drawing Figures

PULSED FEEDBACK CIRCUIT FOR AN OPTOELECTRONIC DETECTOR

The present invention relates to a pulsed feedback circuit for an optoelectronic detector having a radiation-emitting element and a radiation-sensitive element.

Optoelectronic circuits are used extensively in detectors e.g. for controlling door operations in buses, for starting escalators etc., in which a light beam between an incandescent lamp and a photo resistor is broken, and also in so called reflex detectors in industrial applications, in which the reflected light from a light-emitting diode is detected by a (frequently Darlington-connected) phototransistor circuit. These known optoelectronic circuits however have the disadvantage that they involve relatively large current consumption, or require complicated screening in order that the light source can be operated at a level of intensity which exceeds with a satisfactory safety margin the maximum disturbance from external light. This disadvantage has essentially restricted the fields of use for optoelectronic detectors to those in which connection to a mains supply may be used.

As an aid for a blind person for example, a special type of battery-operated portable optoelectronic detector has been developed in the shape of a stick, at the top of which there is a laser diode emitting light which upon reflection against objects in the vicinity is detected by a photo-transistor and then gives an acoustic signal to the blind person. Discrimination from external light is here a difficult problem, which has given rise to the use of laser pulses of the highest intensity permitted whilst allowing for radiation protection, and the resulting high current consumption has restricted the time of the stick to only a few hours. Possibly this problem could be overcome, at least partially, if feedback is used between light-emitting and light-sensitive elements of the detector.

Optoelectronic detectors have a large potential field of application in various types of automatic guard systems, e.g. burglar alarms, where now mainly systems based on microwaves or ultrasonic sound are used. For these last mentioned types of radiation problems caused by disturbances from external radiation are appreciably smaller. The drawback with these types of radiation, however, is that the propagation thereof is frequently not sufficiently distinct to distinguish between, for instance, movements inside and movements outside an outer wall of a house. Here optical radiation would be highly preferable provided that the problem arising from external light could be overcome. In this case it might even be possible to utilize the possibilities existing in the case of optical radiation to transmit a well collimated beam to a greater distance so that remote supervision systems could be realised which have small current consumption, e.g. a system in which an area of a couple of square meters some hundred meters away might be automatically remotely supervised.

A solution of the problem arising with the detector system as described above, which solution is technically satisfactory, calls for the detection criterion to be based on changes of the reflection capacity of the observed area and not on changes of the intensity of the reflected light. Only in this way can the detection criterion be independent of external light and merely dependant on changes in the character of the observed area. The simplest solution from a technical point of view to attain this kind of detection criterion possibly involves the use of a feedback between the light source and the light-sensitive element, whereby light emitted from the light source can be selectively amplified and external light may have substantially no effect.

A further potential field of application for optoelectronic circuits is in optoelectronic detectors for manual control in the first place of electric systems. In this context also, in order to attain good discrimination from external disturbing light a feedback circuit of the above discussed type is desirable.

Optoelectronic feedback circuits are also of interest for various special applications. For example with the above mentioned type of optoelectronic supervision applications it would be desirable to be able to use a circuit reacting to rapid changes of the reflection capacity of the observed area while ignoring slow changes. For such application, as an optoelectronic control circuit it would be advantageous to have a circuit in which the existing value of an output signal corresponding to a predetermined feedback factor can be locked if there are rapid changes of the feedback factor. In this way an optoelectronic circuit may be realised which is useful for continuous control. The continuous control can then be obtained at slow changes of the feedback factor and can be locked at rapid changes.

Optoelectronic circuits comprising a feedback between radiation-emitting and radiation-sensitive elements are already known.

In British Patent Specification No. 1,164,793 a circuit is described, in which an oscillating radiation obtained by feedback is used to bring about a discrimination from disturbances caused by external light. The oscillation arises in the circuit of said Patent Specification by the radiation from a radiation-emitting element being reduced when the radiation on a radiation-sensitive element is increased. The circuit required for this function is relatively complicated and for this reason may not be useful in, e.g. the type of manual optoelectronic control circuit described above.

In Swedish Patent Specification No. 356,129 a special design of an optoelectronic feed back circuit is described having a memory function for a special application, namely pulse detection. This circuit, however, does not show the function desired for the above-mentioned applications that is the ability to react to rapid changes of the feedback factor and possibly also then to lock the output signal.

An object of the present invention is to realise the above described desired features of an optoelectronic feedback circuit whilst requiring few components and such that provision may be made for the capability of reacting to rapid changes of the feedback factor and possibly also of locking the output signal at a certain value.

According to the invention therefore there is provided a pulsed feedback circuit for an optoelectronic detector having a radiation-emitting element and a radiation-sensitive element, characterised in that the radiation-emitting element is arranged to be fed by a current amplifier, which with the aid of a filter comprising a storing member is so controlled by the radiation-sensitive element through a current amplifier input having low impedance in the forward direction and high impedance in the reverse direction, that increasing current transients in a load circuit fed by the current amplifier are selectively amplified at optical feedback between the radiation-emitting element and the radiation-sensitive element and give rise to sharp, intermittent radiation pulses from the radiation-emitting element separated by longer intervals during which this element is entirely extinguished, the amplitude and frequency of the pulses being dependent upon the feedback factor of the feedback.

In a simple embodiment of the invention which is particularly preferable from a cost point of view the current amplifier consists of a transistor, the radiation-emitting element consists of a light-emitting diode, which is connected between a supply voltage and the collector of the transistor, the radiation-sensitive element consists of a photo-transistor, the collector of which is connected to the supply voltage, and the filter consists of a resistor connected to the emitter of the photo-transistor and a capacitor, which as said storing member is connected between the emitter of the photo-transistor and the base of the transistor. Also there is a discharge resistor for the capacitor connected between the supply voltage and the base of the transistor.

An additional preferred embodiment of the invention is characterised in that the load circuit of the current amplifier comprises a locking circuit connected in parallel with a load resistor, which locking circuit comprises partly a first series link, comprising a diode and a capacitor connected in parallel with a resistor, partly a second series link, consisting of an additional diode and of an additional capacitor, and partly of a transistor, the base of which is connected with the capacitor in the first series link and the collector of which is connected between the diode and the capacitor in the second series link so that an output signal taken out across the capacitor of the second series link is locked to the prevailing value when there is a rapid reduction of the feedback factor of the feedback circuit.

Figure 2:
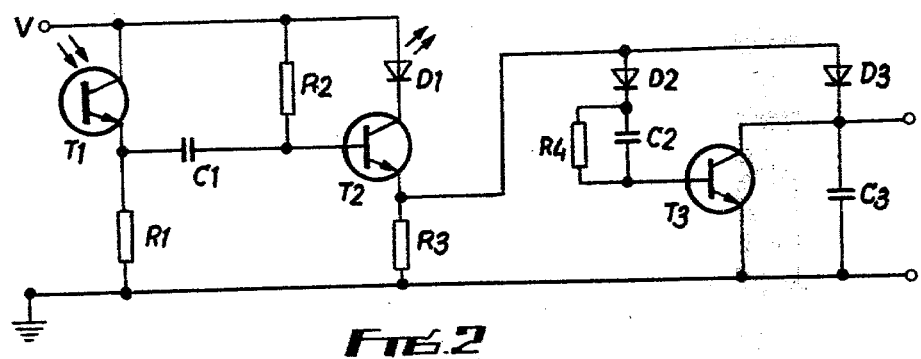

The invention will now be described further by way of example only and with reference to the accompanying drawings in which:

FIG. 1 is a circuit diagram of one embodiment of the invention having a minimum number of components; and FIG. 2 is a circuit diagram of a modification of the embodiment of FIG. 1 with which a rapid reduction of the feedback factor can lock the existing value of the output signal.

In the feedback circuit shown in FIG. 1 a photo-transistor T1 has its collector connected to a supply voltage V and has its emitter connected to the base of a transistor T2 through a filter consisting of a resistor R1 and a capacitor C1. A discharge resistor R2 for the capacitor C1 is furthermore connected between the supply voltage V and the base of the transistor T2.

The feedback circuit according to FIG. 1 operates as follows:

When the photo-transistor T1 is illuminated a current substantially proportional to the light intensity flows through the photo-transistor. The capacitor C1 forms together with the resistor R1 and the base-emitter impedance of the transistor T2 a filter, which only allows increasing current transients from the photo-transistor T1 to pass through the transistor T2. Direct current components are blocked by the capacitor C1 and decreasing current transients are blocked by the high reverse impedance of the transistor T2. If an increasing current transient occurs in the current through the photo-transistor T1, this transient is conducted through the capacitor C1 to the base of the transistor T2, whereby a corresponding amplified current transient flows through a light-emitting diode D1 which is connected to the collector of the transistor T2. As the light intensity impinging on the photo-transistor T1 increases, an increasing current is obtained through the capacitor C1 and through the light-emitting diode D1, whereby also the light intensity delivered by the light-emitting diode D1 increases. If there is optical feedback between the light-emitting diode D1 and the photo-transistor T1 the increasing current transient will accordingly grow to a maximum value. If it is assumed that a linear feedback factor $k(<1)$ is valid for the entire system, the current in the load resistor R3 will rise from a rest value $I_o$ to a value determined by the feedback factor k $$I_{max}(k) = I_o/(1-k)$$

(For large current transients a current limitation may also take place due to the voltage across the capacitor C1 reaching its highest possible value).

When the current has risen to its maximum value $I_{max}(k)$ the increasing current transient passing through capacitor C1 and feeding the light-emitting diode D1 disappears, whereby the latter is extinguished. This condition is sustained until the capacitor C1 has been discharged through the resistor R2, whereupon a weak current through the resistor R2 again starts flowing through the transistor T2 and feeding the light-emitting diode D1, and another rapidly increasing current transient occurs again due to the feedback connection, and so on. As the charge of the capacitor C1, which is discharged between the pulses through the resistor R2, is dependent upon the current $I_{max}(k)$, the pulse amplitude as well as the pulse interval is decreased as the feedback factor decreases, and this may be utilized as a detection criterion.

If the optical feedback between the photo-transistor T1 and the light-emitting diode D1 is interrupted, the weak current through the resistor R2 causes a weak rest current through the transistor T2 to flow through the light-emitting diode D1.

FIG. 2 shows an embodiment of the invention comprising a locking circuit which locks the existing value of the output signal at a rapid reduction of the feedback factor. The locking circuit is a further development of the feedback circuit shown in FIG. 1 and is connected in parallel with the load resistor R3 of such feedback circuit. The locking circuit comprises partly a first series link consisting of a diode D2 and a capacitor C2 connected in parallel with a resistor R4, and partly a second series link consisting of an additional diode D3 and an additional capacitor C3. Also, the locking circuit comprises a transistor T3, the base of which is connected with the capacitor C2 in the first series link and the collector of which is connected between the diode D3 and the capacitor C3 in the second series link. The output signal from the locking circuit is then fed off across the capacitor C3.

The operation of the locking circuit according to FIG. 2 is as follows. The capacitors C2 and C3 are charged through the diodes D2 and D3 to the top value of the voltage pulses generated by the current transients across the resistor R3. During the intervals between the pulses the capacitor C2 is partially discharged through the resistor R4 and the voltage across the capacitor C2 has a saw-tooth waveform. Base current in the transistor T3 therefore occurs only during the pulses and then only provided that the top value of the succeeding pulse exceeds the value to which the capacitor C2 has been discharged. If the top voltage of the pulses decreases more rapidly than the decrease in voltage across the capacitor C2 due to discharge of same through the resistor R4, no base current will pass through T3. The capacitor C3 cannot, therefore, in this case be discharged through transistor T3. Normally, with the pulses, the capacitor C3 is momentarily charged to the top value in question, and the voltage is distributed rectangularly with respect to time. However, if the top voltage decreases too rapidly (in relation to the time constant of the circuit element R4C2) the value of the voltage across the capacitor C3 is locked. By an appropriate choice of the time constance of the circuit element R4C2 it may accordingly be achieved that the output voltage follows slow changes of the feedback factor, but is locked at rapid changes of the same, whereby a voltage difference arises between the capacitors C2 and C3 which may be utilized as a detection criterion. Owing to the fact that the voltage is distributed rectangularly with time the top value is normally locked before the rapid change of the feedback factor.

It should be noted that numerous different modifications are possible within the scope of the invention. For example the resistor R1 may be replaced by an inductor or by more complicated filters in order to avoid bottoming occurring at large direct current components. In order to increase sensitivity the transistor T2 may be replaced by a Darlington circuit or by another more complicated current amplifier having low impedance in the forward direction and high impedance in the reverse direction. The photo-transistor as well as the light-emitting diode may also be replaced by more complicated elements, for instance lense systems for better directional resolution, laser systems or the like.

The embodiments described above may be used in any suitable field of application as hereinbefore discussed.

I claim:

1. An optoelectronic detector having:
   a radiation-emitting element;
   a radiation-sensitive element arranged for receiving radiation emitted by the radiation-emitting element;
   a current amplifier connected to the radiation-emitting element for feeding operating power thereto and having an input circuit and a load circuit; said input circuit of the current amplifier being connected to said radiation-sensitive element and incorporating a filter which includes a storage member and has a low impedance in a forward direction and a high impedance in a reverse direction so that the increasing current transients in said load circuit of the current amplifier are selectively amplified by the amplifier with optical feedback between the radiation-emitting and radiation-sensitive elements; whereby said radiating-emitting and radiation-sensitive elements interconnected via said current amplifier and said optical feedback define a pulse generator which produces sharp, intermittent radiation pulses from the radiation-emitting element separated by longer intervals during which the radiation-emitting element is entirely extinguished, the amplitude and frequency of the pulses being dependent upon the feedback factor of the said optical feedback.

2. A pulsed feedback circuit according to claim 1, wherein the current amplifier consists of a transistor that the radiation-emitting element consists of a light-emitting diode, which is connected between a supply voltage and the collector of the transistor; that the radiation-emitting element consists of photo-transistor, the collector of which is connected with the supply voltage; that the filter consists of a resistor connected to the emitter of the photo-transistor and of a capacitor, which as a storing member is connected between the emitter of the photo-transistor and the base of the transistor; that a resistor arranged for the discharge of the capacitor is connected between the supply voltage and the base of the transistor.

3. A pulsed feedback circuit according to claim 1 wherein the load circuit of the current amplifier comprises a locking circuit connected in parallel with a load resistor, which comprises partly a first series link consisting of a diode and a capacitor connected in parallel with a resistor, partly a second series link consisting of an additional diode and an additional capacitor, and partly a transistor, the base of which is connected with the capacitor in the first series link and the collector of which is connected between the diode and the capacitor in the second series link, an output signal taken out across the capacitor of the second series link being locked to the existing value at a rapid decrease of the feedback factor of the feedback circuit.

* * * * *